Patented June 12, 1928.

1,673,273

UNITED STATES PATENT OFFICE.

LEO WALLERSTEIN, OF NEW YORK, N. Y., ASSIGNOR TO WALLERSTEIN COMPANY, INC., OF NEW YORK, N. Y., A CORPORATION OF NEW YORK.

PROCESS OF MAKING BEVERAGE EXTRACTS.

No Drawing.   Application filed August 13, 1920.  Serial No. 403,211.

This invention relates to an improved cereal extract for making beverages, said extract being particularly adapted for making beverages which have the characteristics of beer except for a low alcoholic content, and to a process of making the same.

In making malt extracts, malt is usually principally used, other grains, such as wheat, rice and barley, corn and oats being sometimes used as adjuncts. In the ordinary manufacture of such extracts, the ground malt is mixed with water to make a mash which is then brought to a proper temperature for conversion, and conversion proceeds until the diastase of the malt has changed the starches into dextrines and fermentable sugars. If other grains are used, they are usually separately cooked, a little malt having been previously added for the purpose of liquefying the starch. This cooked grain mash is then added to the malt mash before or during conversion.

After conversion, the grains and dregs containing the insoluble proteins and other waste substances are separated from the wort, and the filtered liquor is concentrated into a thick syrup by evaporation. Variations of this process are employed, but, in the main, the usual process of making malt syrups is generally in accordance with that above described.

It is obvious that an extract made in the manner above described will contain only such protein substances as are soluble in the water used. Further, some of the soluble proteins extracted by the water are coagulated in subsequent operations, and this coagulated protein is precipitated and usually filtered out. In this process, therefore, there is necessarily a very considerable loss of proteins.

It is, of course, well known that somewhat higher percentages of proteins may be obtained by careful mashing at low initial temperatures, say, about 50° C., but this practice results in the production of a low percentage of dextrines and a high percentage of maltose. Such practice is, therefore, not desirable for the production of an extract for making beverages having a low alcohol content, because the maltose is fermentable and tends to increase the alcohol content of the beverage.

Such extracts as have been referred to are not well adapted for making cereal beverages having a low alcoholic content, because of the high percentage of fermentable substances. Extracts which are especially prepared for the production of such low alcoholic beverages are, therefore, usually made by largely reducing the percentage of malt and correspondingly increasing the percentage of starchy grains. The method of procedure is, however, substantially that above described, except that higher conversion temperatures are used. The resulting extract has a low percentage of fermentable substances, and, further, is very low in proteins. In such extracts the percentage of proteins is sometimes as low as 2 percent of the total solids considered as dry solids. Beverages made from such extracts, because of the subsequent dilution, are, therefore, very low in proteins, sometimes exhibiting a protein content as low as 0.1 percent.

Further, in making beverages from these highly dextrinous extracts, the original gravity of the wort is usually low, because it is desired not only to avoid the formation of undesired percentages of alcohol, but also to avoid the production of beverages which are too high in extractive matters, such as carbohydrates. A beverage which contains too high a percentage of carbohydrates is not palatable and is regarded as difficult of digestion. Such beverages are, therefore, usually prepared from a wort having an original gravity of about 5° to 7° Balling. This dilution, while it reduces the carbohydrates, also, of course, reduces the proteins. The proteins are, however, largely responsible for the palatability, the foam producing and foam keeping qualities, the nutritive quality, and the stimulating effect of the beverage.

The novel extract which is the subject of this invention is characterized by a comparatively low percentage of fermentable sugars and a high percentage of proteins, the proteins being so treated during manufacture that a high percentage of them is retained in soluble form in the extract. Beverages made from such extracts will, therefore, have an increased protein content, with the result that the palatability, the foam producing and foam keeping qualities, the nutritive quality and the stimulating effect of the beverage will be increased. The proteins have, as is well-known, a stimulating effect and the increase in the proteins replaces, to a certain extent, the loss in stimulating effect due to the reduction of the alcohol.

In making this novel extract, a cereal mash is made, and during the further procedure, diastatic conversion is allowed to take place. The mash may, of course, consist of malt alone, or it may consist of a mixture of malt and unmalted cereals, but when such a mixture is used the percentage of malt is preferably high. Where unmalted cereals are used, they should usually be boiled prior to conversion to gelatinize the starch. Before, during, or after conversion, a proteolyzing agent, such as a proteolytic enzym, is added to the mash to effect the substantial proteolysis of the proteins contained in the mash.

Enzyms which have been found satisfactory for the proteolysis referred to are papain and pepsin. The proportion in which the enzyms are added is of considerable importance. Satisfactory results have been obtained by the use of one pound U. S. P. pepsin 1:3000, or one pound of ordinary commerical papain for each one hundred pounds of protein contained in the mash. Under ordinary conditions, papain will, however, give better results than pepsin.

To secure the best results, as much of the protein contained in the mash as is possible should be proteolyzed, and to accomplished this, the time element should be taken into consideration. Where a pound of the enzyms referred to to one hundred pounds of protein contained in the mash is used, the proteolysis, with a mash consisting of malt or malt and unmalted cereals, may be effected in about twenty-four hours. The speed of proteolysis may, however, be increased by the addition of more enzym, or, if speed is unimportant, a less amount of enzym may be used and the proteolysis allowed to go on for a longer time. The action of the enzym used will, also, to some extent, be affected by the kind of cereal employed, that is, by the character of the proteins to be proteolyzed. Exact rules cannot be given, but, in any case, simple preliminary tests will readily determine the minimum quantity of enzym to be used in the time required.

It will, of course, be understood that proper temperatures for proteolysis must be maintained. In actual practice, it has been found that excellent results are obtained by maintaining the mash during proteolysis at a temperature of about 60° to 65° C.

It is also desirable that the extract contain a high percentage of dextrines and a correspondingly low percentage of fermentable sugars or maltose. If the conversion of the starches into soluble carbohydrates be allowed to go on at temperatures of about 75° C., the percentage of dextrines will be relatively high and the percentage of fermentable sugars or maltose relatively low. Such conversion will produce such percentages of dextrines and maltose that when the extract is diluted to about 5% Balling and fermented with yeast, no more than 1% of alcohol by volume will result. As the temperature of 75° C may be higher than that which is favorable for proteolysis, it may be desirable to allow the conversion to precede proteolysis, the temperature of the mash being lowered after conversion to around 60° to 65° C. Further, by properly controlling the temperature of the mash during proteolysis, a desired latic acid acidity can be obtained and at the same time the maltose content can be lowered, as the formation af lactic acid reduces the maltose. A favorable temperature for the development of lactic acid in the mash is around 50° C. The proteolysis will go on at this temperature, although possibly not so rapidly as at the higher temperatures referred to. If the temperature of the mash be lowered to 50° C. and the mash be allowed to stand for a time at this temperature, lactic acid will develop, pure culture of lactic acid bacteria being added, if desirable. After the desired acidity has been obtained, the temperature can be raised to stop further acidification. After the development of the lactic acid, it may be neutralized, in whole or in part, by the addition of hydroxide of calcium or calcium carbonate. Where this practice is followed, calcium lactate will be found in the finished product. If it is desired to further lower the maltose content, after neutralization the lactic acid development may again be proceeded with, which will change over more maltose, the excess of lactic acid being again neutralized.

After conversion, proteolysis, and adjustment of acidity, if desired, the mash may be filtered and the filtrate concentrated into the thick syrup such as is ordinarily known in the trade as a syrup or extract.

The percentage of soluble, noncoagulable proteins in an extract made in the manner above described, will vary, of course, according to the cereals used and the thoroughness with which the proteolysis is carried on. Where malt alone is used and a sufficient proteolysis is had, the extract will contain a percentage of soluble, noncoagulable proteins amounting to about 14 to 16 percent of the total solids which is much in excess of that which an extract made from a malt according to the prior methods would contain. Further, by a careful selection of unmalted cereals and cereal products which are high in proteins excellent results can be obtained.

As an example of the process described, the following has been found to give satisfactory results.

Taking 850 lbs. of wheat having a protein content of about 12.8% and 150 lbs. of malt having a protein content of about 11%, the wheat and malt are mashed at a temperature of from 75 to 78 degrees C. and saccharified at these temperatures. To one part of grain, approximately four to five parts of water are used for mashing purposes. After saccharafication sufficient for the 1000 lbs. of grain, 1 to 1½ lbs. of papain is added and allowed to act for about 24 hours at a temperature of about 70 degrees C. The proteolized mash is then filtered and the filtrate evaporated to a syrup. The 1000 lbs. of grain above referred to will result in approximately 1000 lbs. of syrup containing about 75% of solids. The content of soluble protein contained in this syrup corresponds to about 14 to 15% of its solids. In actual practice it has been found that by the process described approximately 80 to 90% of the protein contained in the original mash material is thereby made soluble and brought into desirable form. Under ordinary mashing methods, as heretofore practiced, only a small part of the original protein would become a soluble and in desirable form.

What is claimed is:

1. The process of making a beverage extract which consists in making a mash of a material containing malt, permitting the mash to stand at such temperature and for such length of time as will bring about a conversion of the starches into a high percentage of dextrines and a low percentage of fermentable sugars, then adding a proteolytic enzym in such quantity as to increase the content of water soluble protein in the mash or wort, and maintaining the mash at a proteolyzing temperature.

2. The process of making a beverage extract which consists in making a mash consisting principally of malt and wheat, the percentage of wheat being largely in excess of that of the malt, permitting the mash to stand at such temperature and for such length of time as will bring about the conversion of the starches into a high percentage of dextrines and a low percentage of fermentable sugars, then adding a proteolytic enzym in such quantity as to increase the content of water soluble protein in the mash or wort, and maintaining the mash at a proteolyzing temperature.

3. The process of making a beverage extract which consists in making a mash consisting principally of malt and wheat, the percentage of wheat being largely in excess of that of the malt, permitting the mash to stand at such temperature and for such length of time as will bring about the conversion of the starches into a high percentage of dextrines and a low percentage of fermentable sugars, adding in proteolytic enzym in such quantity as will materially increase the content of water soluble protein in the mash or wort, maintaining the mash at proteolyzing temperature until a material increase in water soluble protein occurs, inoculating the mash with lactic acid bacteria and during proteolysis keeping the mash at a temperature approximately 50° C. to allow lactic acid to develop therein.

4. The process of making a beverage extract which consists in making a mash of a material containing malt, permitting the mash to stand at such temperature and for such length of time as will bring about a conversion of the starches into a high percentage of dextrines and a low percentage of fermentable sugars, then adding a proteolytic enzym in such quantity as to increase the content of water soluble protein in the mash or wort, maintaing the mash at a proteolyzing temperature, filtering, and concentrating the filtrate into a thick syrup.

5. The process of making a beverage extract which consists in making a mash consisting principally of malt and wheat, the percentage of wheat being largely in excess of that of the malt, permitting the mash to stand at such temperature and for such length of time as will bring about the conversion of the starches into a high percentage of dextrines and a low percentage of fermentable sugars, then adding a proteolytic enzym in such quantity as to increase the content of water soluble protein in the mash or wort, maintaining the mash at a proteolyzing temperature, filtering, and concentrating the filtrate into a thick syrup.

6. The process of making a beverage extract which consists in making a mash consisting principally of malt and wheat, the percentage of wheat being largely in excess of that of the malt, permitting the mash to stand at such temperature and for such length of time as will bring about the conversion of the starches into a high percentage of dextrines and a low percentage of fermentable sugars, adding a proteolytic enzym in such quantity as will materially increase the content of water soluble protein in the mash or wort, maintaining the mash at proteolyzing temperature until a material increase in water soluble protein occurs, inoculating the mash with lactic acid bacteria during proteolysis keeping the mash at a temperature approximately 50° C. to allow lactic acid to develop therein, filtering and concentrating the filtrate into a thick syrup.

In testimony whereof, I have hereunto set my hand.

LEO WALLERSTEIN.